(No Model.)
J. P. GAMBLE.
NUT LOCK.
No. 562,600. Patented June 23, 1896.
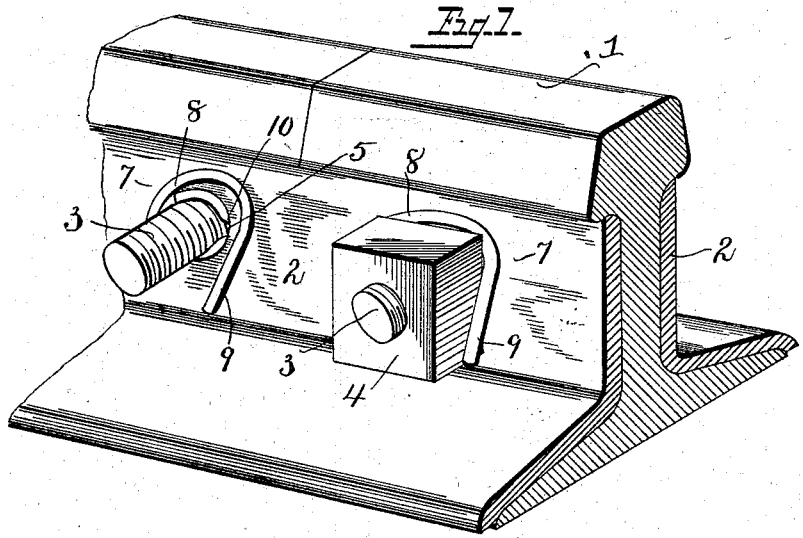
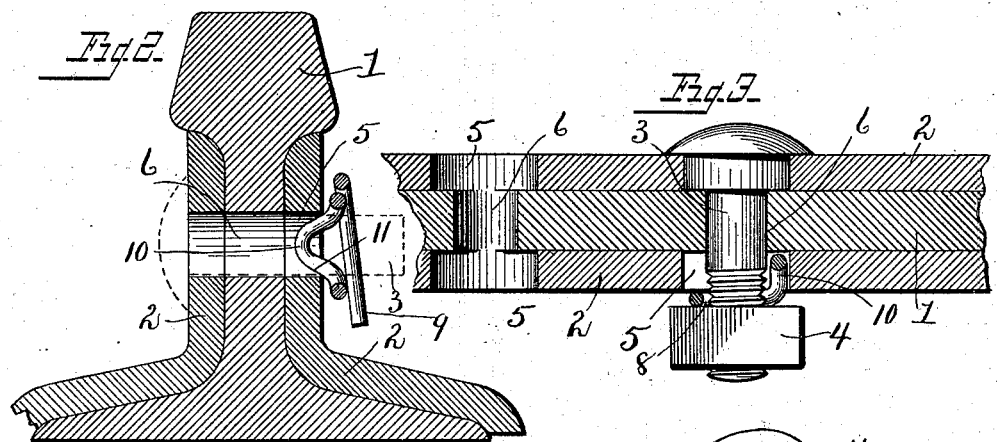
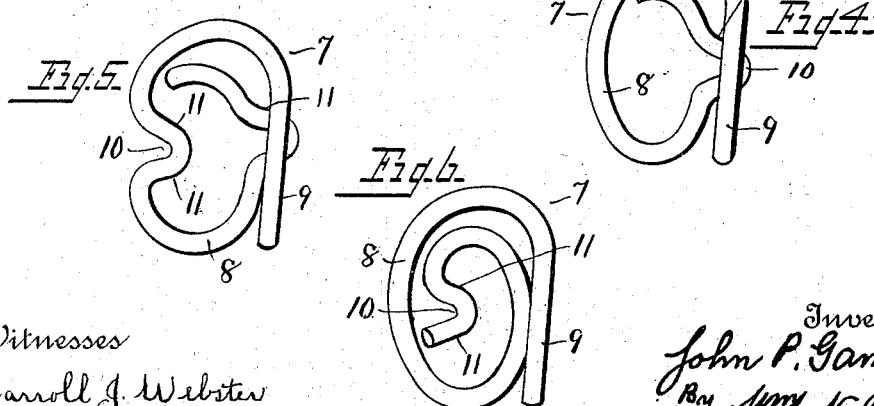
Witnesses
Carroll J. Webster
A. E. Glascock
Inventor
John P. Gamble
By Wm. DuVal Brown
Attorney

UNITED STATES PATENT OFFICE.

JOHN P. GAMBLE, OF LANSING, KANSAS.

NUT-LOCK.

SPECIFICATION forming part of Letters Patent No. 562,600, dated June 23, 1896.

Application filed November 23, 1895. Serial No. 569,938. (No model.)

*To all whom it may concern:*

Be it known that I, JOHN P. GAMBLE, a citizen of the United States, residing at Lansing, in the county of Leavenworth and State of Kansas, have invented certain new and useful Improvements in Nut-Locks; and I do hereby declare the following to be a full, clear, and exact description of the invention, such as will enable others skilled in the art to which it appertains to make and use the same.

This invention relates to a new and useful improvement in nut-locks; and it consists in the construction and arrangement of parts hereinafter described, and definitely pointed out in the claims.

The aim and purpose of this invention is to construct a nut-lock made of a single piece of spring metal forming a washer having a coiled portion surrounding the bolt and a loop formed by crimping or bending the metal, this loop adapted to fit into the aperture in the fish-plate, and a spring end portion forming a tongue adapted to engage the side face of the nut.

Another object of this invention is to provide a nut-lock which is adapted to be used with the ordinary rails, fish-plates, nuts, and bolts as now used in making continuous rail-joints. In this ordinary construction the aperture in the rail is circular and the aperture in the fish-plate is elongated, and when the bolt is passed through the rail-aperture a space is left on each side of the bolt in the fish-plate aperture, and it is the purpose of this invention to utilize this space on either or both sides by forming a loop on the washer to fit into this space to prevent the washer from turning when the nut is being screwed on.

A further object of this invention is to form this loop with inclined sides, so that when the washer is in place around the bolt and this loop extending into the fish-plate aperture the inclined sides of the loop will bear against the sides of the fish-plate aperture. This washer is made of spring metal, so when this loop is inserted in the aperture the sides of the loop will be compressed and bear against the sides of the aperture in the fish-plate with a spring-tension and firmly hold and prevent the washer from turning or moving when the nut is being screwed home.

While I have shown my improved washer nut-lock applied only to a rail and fish-plate, it is evident that I do not limit myself to this construction and particular purpose, but could use it in various places where a nut-lock of this construction would be desirable.

These and other objects not hereinbefore described are accomplished by the construction illustrated in the accompanying drawings, wherein like figures of reference indicate corresponding parts in the several views, and in which—

Figure 1 is a perspective view of a rail-joint, showing my improved nut-lock applied thereto. Fig. 2 is a vertical cross-section through the rail, fish-plate, and washer, the bolt being shown in dotted lines. Fig. 3 is a longitudinal section through the rail at the bolt and nut. Fig. 4 is a perspective view of the washer detached. Fig. 5 is a perspective view of a modification, and Fig. 6 is a perspective view of a still further modification.

In the drawings, 1 represents a rail; 2, the fish-plates placed on opposite sides of the rail; 3, the bolts, and 4 the nuts; the rail, fish-plates, bolts, and nuts being of the ordinary usual construction now used in making continuous rail-joints. These fish-plates, as now constructed, are formed with elongated apertures 5, which are larger and longer than the apertures 6 in the rail, as shown in Figs. 1 and 3. My improved washer is adapted to be used in connection with this ordinary style of fish-plate without in any manner altering the construction, and can be used again after the nut has been removed.

7 designates my improved washer, which consists of a single piece of spring-metal wire, or other suitable material. In the drawings, I have shown this washer circular in cross-section, although in practice I may make the washer of other shapes, such, for instance, as rectangular in cross-section. This washer consists of the horizontal coiled portion 8 and the straight end spring portion 9. The horizontal coiled portion 8 is preferably bent in the form of a spiral, as shown in Fig. 2, and is provided with a loop portion 10 intermediate its ends, which is formed by crimping or bending down a portion of the coiled portion. This loop portion is formed with inclined sides 11, which incline inwardly toward each other and converge at the base of the loop, forming substantially a V-shaped loop.

In the construction of fish-plates, the screw-threaded end of the bolt does not fully occupy the aperture in the plate, leaving a space between the sides of the aperture and bolt, as shown in Figs. 2 and 3. In this space I place the loop portion 10 of the washer, the bolt passing within the coiled portion 8, as shown in the said Figs. 2 and 3. I then apply the nut 4. It will be seen that the coiled portion 8 toward its outer end becomes larger until it reaches beyond the side of the nut, and is then bent straight and upwardly at an acute angle to the plane of the base of the nut and parallel with the sides thereof. This coiled portion lying between the nut and plate forms a bearing-surface or bed for the nut and the harder the nut is screwed on the firmer will the washer be held in place. In practice this washer is formed from a single straight piece and is then bent into the form described. By forming the loop portion with the inclined sides 11, when the washer is in place, and the loop portion extending down into the aperture in the fish-plate beside the bolt, these inclined sides will bear against the sides of the aperture, as plainly shown in Fig. 2, and when pressure is exerted on the washer, which is done when the nut is screwed on, the loop portion will be forced farther into the aperture and the inclined sides will be pressed in, and at the same time exert a spring-tension on the side of the aperture and firmly lock the washer in place and prevent it from wabbling or turning when the nut is being screwed home.

In Fig. 5 I show the washer with two oppositely-arranged loop portions formed in the coiled portion intermediate its ends. These loop portions are provided with the inclined sides, as before described. In this construction, when the washer is in place, these loop portions will occupy both of the spaces in the aperture of the fish-plate on opposite sides of the bolt, when the bolt is in place, and thereby firmly lock and center the washer when the nut is being turned.

In Fig. 6 I show a further modification, wherein the loop portion 10 is formed at the end of the coil instead of intermediate its ends. This loop portion is provided with the same inclined sides and is intended to be used and operated the same as before described and shown in the other figures.

I am aware that it is not broadly new to construct a washer of spring-wire having a spiral coil surrounding the nut, a spring end portion adapted to engage the side face of the nut to prevent the same from turning, and a projection at the opposite end of the spiral coil adapted to fit into an aperture to prevent the washer from turning.

Having thus described my invention, what I claim as new, and desire to secure by Letters Patent, is—

1. A nut-lock consisting of a single strip of spring metal forming a washer, having a coiled portion adapted to surround a bolt, a loop portion formed in the washer adapted to fit into a stationary aperture, one end of the coiled portion extending beyond the side of the nut, and having an end spring portion extending up from the end of the coiled portion at an acute angle to the plane of the base of the nut and adapted to bear against the side face thereof, substantially as described.

2. A nut-lock consisting of a single strip of spring metal forming a washer, having a coiled portion adapted to surround a bolt, a loop portion formed in the washer adapted to fit into a stationary aperture, and having sides inclined inwardly and converging at the base of the loop, forming substantially a V-shaped loop, the inclined sides of the loop adapted when placed in the aperture to bear against the sides thereof and firmly hold the washer in place, substantially as described.

3. A nut-lock consisting of a single strip of spring metal forming a washer, having a coiled portion adapted to surround a bolt, loop portions formed in the washer on opposite sides of the coiled portion and adapted to fit into a stationary aperture on opposite sides of the bolt, one end of the coiled portion extending beyond the side of the nut, and having an end spring portion extending up from the end of the coiled portion at an acute angle to the plane of the base of the nut and adapted to bear against the side face thereof, substantially as described.

4. A nut-lock consisting of a single strip of spring metal forming a washer, having a coiled portion adapted to surround a bolt, loop portions formed in the washer on opposite sides of the coiled portion and adapted to fit into a stationary aperture on opposite sides of the bolt, the loop portions having sides inclined inwardly and converging at the base of the loops, the inclined sides of the loops adapted when placed in the aperture on the opposite side of the bolt to bear against the sides of the aperture and firmly hold and center the washer in place, substantially as described.

5. A nut-lock consisting of a single strip of spring metal forming a washer, having a coiled portion adapted to surround a bolt, a loop portion formed in the washer adapted to fit into the bolt-aperture of the fish-plate, having sides inclined inwardly and converging at the base of the loop, forming substantially a V-shaped loop, the inclined sides of the loop adapted when placed in the aperture to bear against the sides thereof and firmly hold the washer in place, and one end of the coiled portion extending beyond the side of the nut, and having an end spring portion extending up from the end of the coiled portion at an acute angle to the plane of the base of the nut and adapted to bear against the side face thereof, substantially as described.

In testimony whereof I affix my signature in presence of two witnesses.

JOHN P. GAMBLE.

Witnesses:
BERTHA L. DANA,
WM. DU VAL BROWN.